US012586368B2

(12) United States Patent
Wang et al.

(10) Patent No.: US 12,586,368 B2
(45) Date of Patent: Mar. 24, 2026

(54) METHOD, ELECTRONIC DEVICE, AND COMPUTER PROGRAM PRODUCT FOR GENERATING IMAGE

(71) Applicant: Dell Products L.P., Round Rock, TX (US)

(72) Inventors: Zijia Wang, Weifang (CN); Zhisong Liu, Shenzhen (CN); Min Gong, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/502,704

(22) Filed: Nov. 6, 2023

(65) Prior Publication Data

US 2025/0124706 A1     Apr. 17, 2025

(30) Foreign Application Priority Data

Oct. 13, 2023     (CN) .......................... 202311332242.6

(51) Int. Cl.
| | |
|---|---|
| *G06V 10/86* | (2022.01) |
| *G06T 11/00* | (2006.01) |
| *G06V 10/774* | (2022.01) |
| *G06V 10/82* | (2022.01) |
| *G06V 20/70* | (2022.01) |

(52) U.S. Cl.
CPC .............. *G06V 10/86* (2022.01); *G06T 11/00* (2013.01); *G06V 10/774* (2022.01); *G06V 10/82* (2022.01); *G06V 20/70* (2022.01)

(58) Field of Classification Search
None
See application file for complete search history.

(56) References Cited

U.S. PATENT DOCUMENTS

2024/0221235 A1*   7/2024   Gafni ..................... G06V 10/26

OTHER PUBLICATIONS

T. Yang et al., "GAN Prior Embedded Network for Blind Face Restoration in the Wild," arXiv:2105.06070v1, May 13, 2021, 10 pages.

(Continued)

*Primary Examiner* — Leon Flores
(74) *Attorney, Agent, or Firm* — Ryan, Mason & Lewis, LLP

(57) ABSTRACT

Embodiments of the present disclosure relate to a method, an electronic device, and a computer program product for generating an image. The method includes acquiring a semantic segmentation graph by performing semantic segmentation on a source image. The method further includes acquiring a key word for describing a feature of a to-be-generated target image. The method further includes transforming the semantic segmentation graph by using the key word so as to acquire a transformed semantic segmentation graph. The method further includes generating the target image based on the transformed semantic segmentation graph. According to the method of embodiments of the present disclosure, a semantic segmentation graph of a source image and a key word can be used to generate a target image, so as to make the generated target image have a target feature and have semantic consistency with the source image, thereby generating a high-quality target image.

20 Claims, 5 Drawing Sheets

(56) References Cited

OTHER PUBLICATIONS

I. J. Goodfellow et al., "Generative Adversarial Nets," Advances in Neural Information Processing Systems, arXiv:1406.2661v1, Jun. 10, 2014, 9 pages.
H. Zhang et al., "StackGAN++: Realistic Image Synthesis with Stacked Generative Adversarial Networks," IEEE Transactions on Pattern Analysis and Machine Intelligence, arXiv:1710.10916v3, Jun. 28, 2018, 16 pages.
M. Elasri et al., "Image Generation: A Review," Neural Processing Letters, vol. 54, Mar. 11, 2022, pp. 4609-4646.
A. Radford et al., "Learning Transferable Visual Models From Natural Language Supervision," International Conference on Machine Learning, arXiv:2103.00020v1, Feb. 26, 2021, 48 pages.

* cited by examiner

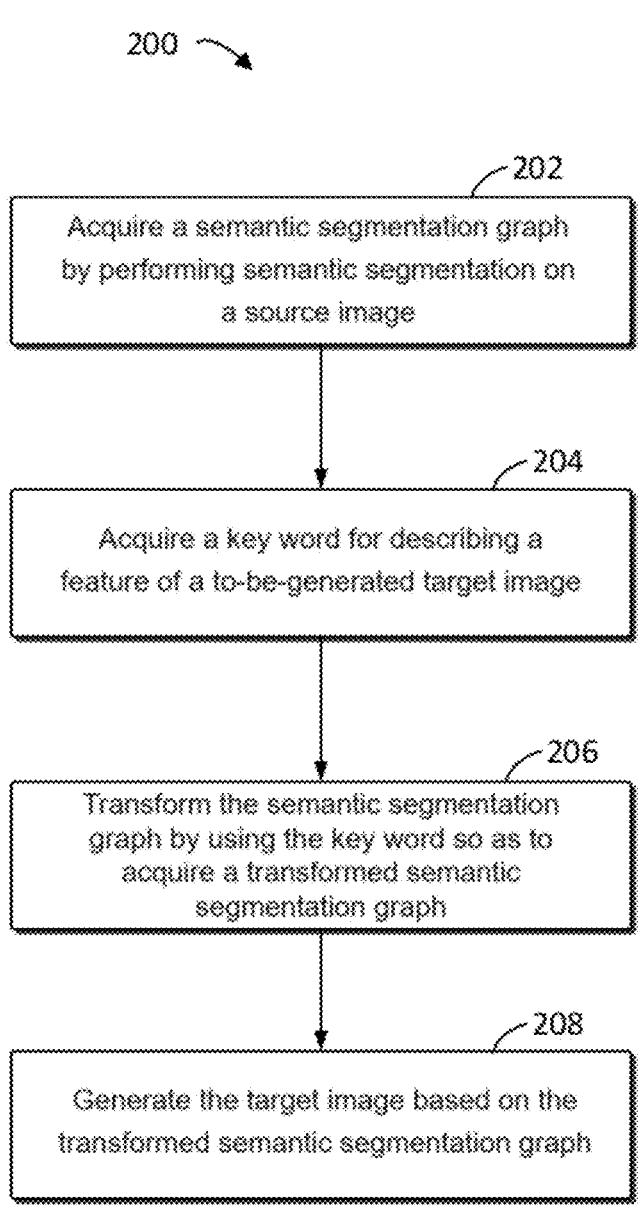

200

202
Acquire a semantic segmentation graph by performing semantic segmentation on a source image 204
Acquire a key word for describing a feature of a to-be-generated target image 206
Transform the semantic segmentation graph by using the key word so as to acquire a transformed semantic segmentation graph 208
Generate the target image based on the transformed semantic segmentation graph

FIG. 2

METHOD, ELECTRONIC DEVICE, AND COMPUTER PROGRAM PRODUCT FOR GENERATING IMAGE

RELATED APPLICATION

The present application claims priority to Chinese Patent Application No. 202311332242.6, filed Oct. 13, 2023, and entitled "Method, Electronic Device, and Computer Program Product for Generating Image," which is incorporated by reference herein in its entirety.

FIELD

Embodiments of the present disclosure relate to the field of image processing, and specifically relate to a method, an electronic device, and a computer program product for generating an image.

BACKGROUND

With the increasing functionality of electronic devices, image processing has been widely applied in various applications of electronic devices, such as computer vision, autonomous driving, facial recognition, and medical imaging.

For some applications, there is a high requirement for accuracy of image processing. To improve the accuracy of image processing, these applications usually use image processing models for image processing. However, as demands of users increase, these image processing models may face increasingly severe challenges in terms of accuracy.

SUMMARY

Embodiments of the present disclosure provide a method, an electronic device, and a computer program product for generating an image.

According to a first aspect of the present disclosure, a method for generating an image is provided. The method includes acquiring a semantic segmentation graph by performing semantic segmentation on a source image. The method further includes acquiring a key word for describing a feature of a to-be-generated target image. The method further includes transforming the semantic segmentation graph by using the key word so as to acquire a transformed semantic segmentation graph. The method further includes generating the target image based on the transformed semantic segmentation graph.

According to a second aspect of the present disclosure, an electronic device is provided. The electronic device includes at least one processor; and a memory coupled to the at least one processor and having instructions stored thereon, wherein the instructions, when executed by the at least one processor, cause the electronic device to perform actions including: acquiring a semantic segmentation graph by performing semantic segmentation on a source image. The actions further include acquiring a key word for describing a feature of a to-be-generated target image. The actions further include transforming the semantic segmentation graph by using the key word so as to acquire a transformed semantic segmentation graph. The actions further include generating the target image based on the transformed semantic segmentation graph.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, wherein identical reference numerals generally represent identical components in the example embodiments of the present disclosure.

FIG. 2 shows a flow chart of a method for generating an image according to an embodiment of the present disclosure;

In each accompanying drawing, identical or corresponding numerals represent identical or corresponding parts.

DETAILED DESCRIPTION

Figure 1:
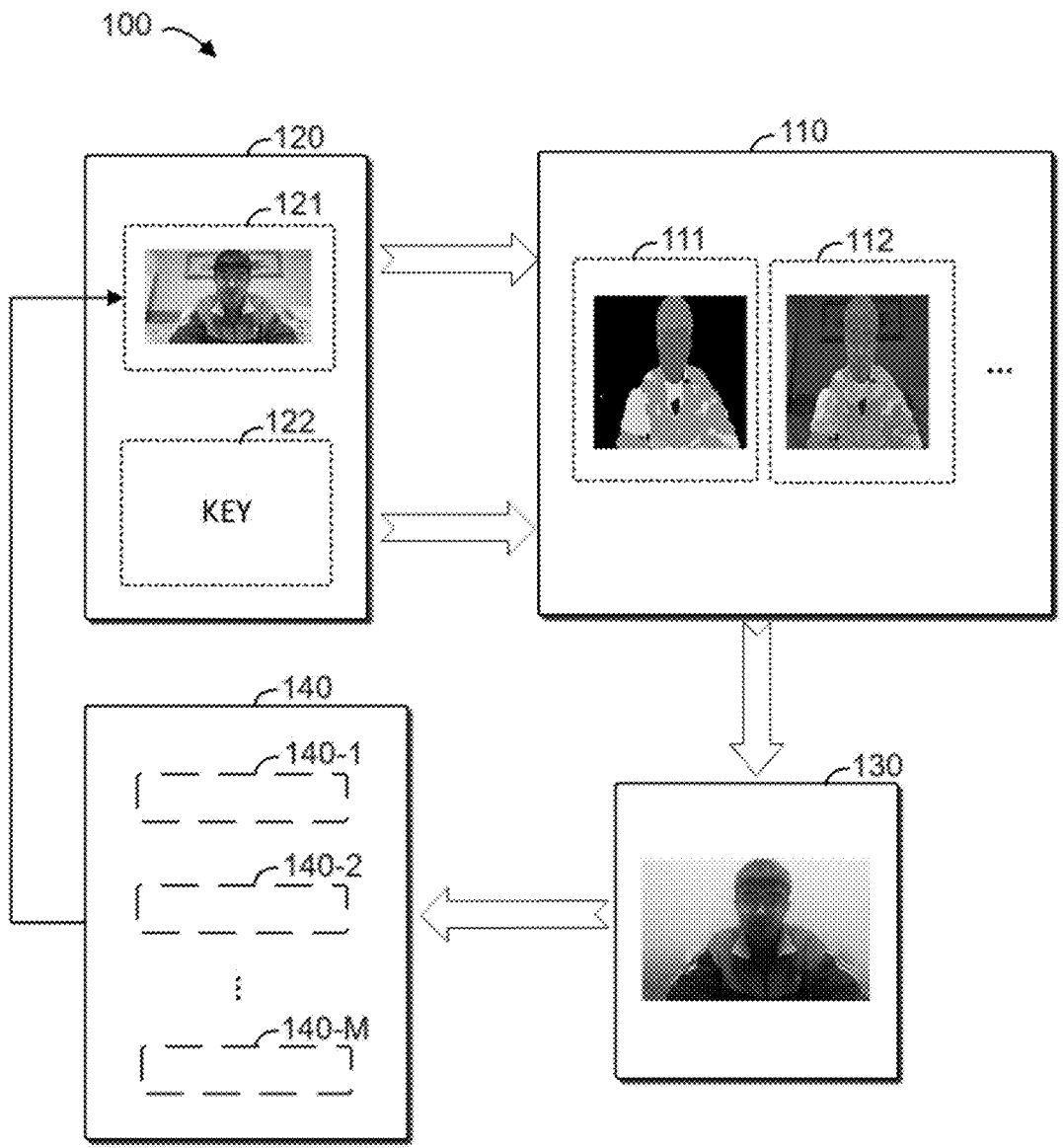
FIG. 1 shows a schematic diagram of an example environment in which a device and/or method according to an embodiment of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

With the development of electronic devices, more and more applications in the electronic devices use image processing models to perform image processing. For example, semantic segmentation models have been widely used in various applications of electronic devices, such as computer vision, autonomous driving, facial recognition, and medical imaging. A semantic segmentation model is trained based on a training dataset, and thus can be used to execute image processing such as performing semantic segmentation on images. The accuracy of the semantic segmentation model depends on the size and quality of the training dataset. The training dataset typically includes real-world images obtained from the real world and associated annotation information. However, due to environmental limitations or due to time or labor costs, it is often difficult to obtain sufficient real-world images from the real world. For example, for a semantic segmentation model used in the field of autonomous driving, it is often difficult to obtain sufficient real-world images under various lighting conditions, weather conditions, and other environmental or driving conditions to establish the training dataset. Therefore, it is necessary to generate new images based on obtained real-world images (for example, "source images" in the existing training dataset) to enhance the training dataset.

Usually, during a process of enhancing the training dataset, a new image is generated by randomly flipping, rotating, and scaling an obtained source image. However, only limited kinds of images can be generated in this way. For example, in the case that the source image is an indoor captured image, a new image corresponding to outdoor lighting conditions cannot be generated. In addition, the images generated in this way may not conform to the real-world image type in a complex semantic pattern of the semantic segmentation model, which may cause the training dataset enhanced with such generated images to have an offset, resulting in poor performance and low accuracy of the semantic segmentation model trained from the training dataset with the offset.

In addition, with the development of artificial intelligence (AI), some drawing applications can also generate images; however, these applications are usually designed to generate images for entertainment or cultural creation. These generated images often have significant differences from source images (for example, they have random background or image content transformations relative to the source images) and cannot be used for enhancing the training dataset of a semantic segmentation model.

To solve at least the above and other potential problems, embodiments of the present disclosure provide a method for generating an image. The method includes acquiring a semantic segmentation graph by performing semantic segmentation on a source image. The method further includes acquiring a key word for describing a feature of a to-be-generated target image. The method further includes transforming the semantic segmentation graph by using the key word so as to acquire a transformed semantic segmentation graph. The method further includes generating the target image based on the transformed semantic segmentation graph. According to the method of embodiments of the present disclosure, a semantic segmentation graph of a source image and a key word can be used to generate a target image, so as to make the generated target image have a target feature and have semantic consistency with the source image, thereby generating a high-quality target image in a controllable and customizable manner. This enables the generated target image to effectively enhance the training dataset including the source image, thereby improving the accuracy and robustness of the semantic segmentation model trained using the enhanced training dataset.

Embodiments of the present disclosure will be further described in detail below in conjunction with the accompanying drawings. FIG. 1 shows a schematic diagram of an example environment 100 in which a device and/or method according to an embodiment of the present disclosure can be implemented. The example environment 100 of FIG. 1 shows a device 110 that can implement the device and/or method according to embodiments of the present disclosure. The device 110 can be any electronic device capable of executing the method according to the present disclosure. For example, the device 110 can be an electronic device capable of running a trained neural network model to execute the method according to the present disclosure, such as a computer, a portable electronic device, and a vehicle-mounted terminal.

In some embodiments, an input 120 of the device 110 can receive a source image 121 and a key word (KEY) 122. The source image 121 can be used as a basis of an image generation process, and the key word 122 can describe a feature of a to-be-generated target image 130, such as "atomization" or "adding noise." An example of atomization can involve adding a particular type of feature to at least a portion of the image, such as making at least a background portion of the image appear "foggy," where "foggy" in this example is the key word 122. In some embodiments, the device 110 can acquire semantic segmentation graphs 111 and 112 by performing semantic segmentation on the source image 121 (although FIG. 1 only shows two semantic segmentation graphs, any number of semantic segmentation graphs can be generated according to needs in actual applications). In some embodiments, the device 110 can transform the semantic segmentation graph 111 or 112 by using the key word so as to generate the target image 130 using the transformed semantic segmentation graph. The generated target image 130 has a feature (for example, it has been "atomized" or made "foggy") corresponding to the key word and is similar to the source image 121, which will be further described in the following examples.

In some embodiments, the generated target image 130 can be used to expand a training dataset 140 for training a predetermined semantic segmentation model, i.e., it can be included in the training dataset 140. In some embodiments, the transformed semantic segmentation graph for generating the target image 130 can be used as annotation information of the target image 130. In some embodiments, the source image 121 received by the device 110 is from the training dataset 140. The training dataset 140 may include multiple images 140-1, 140-2 . . . , and 140-M (M is an integer), and can also include annotation information corresponding to each image.

By means of the above method, the semantic segmentation graph of the source image 121 and the key word 122 can be used to generate the target image 130, so as to make the generated target image 130 have a target feature and have semantic consistency with the source image 121, thereby generating a high-quality target image in a controllable and customizable manner. This enables the generated target image 130 to effectively enhance the training dataset 140 including the source image, thereby improving the accuracy and robustness of the semantic segmentation model trained using the enhanced training dataset 140.

FIG. 2 shows a flow chart of a method 200 for generating an image according to an embodiment of the present disclosure. The method of FIG. 2 can be executed by the device 110 shown in FIG. 1. As shown in FIG. 2, at a block 202, semantic segmentation graphs (such as the semantic segmentation graphs 111 and 112 shown in FIG. 1) are acquired by performing semantic segmentation on a source image (for example, the source image 121 shown in FIG. 1). In some embodiments, the source image 121 is an image in a training dataset (for example, the training dataset 140 shown in FIG. 1), and the training dataset 140 is used for training of a predetermined semantic segmentation model. At a block 204, a key word (for example, the key word 122 shown in FIG. 1) for describing a feature of a to-be-generated target image (for example, the target image 130 shown in FIG. 1) is acquired. In some embodiments, the key word 122 can be, for example, "atomization" or "adding noise." It should be understood that the key word 122 can also be any other key word input by a user, such as the above-noted "foggy" key word.

At a block 206, a transformed semantic segmentation graph is acquired by transforming the semantic segmentation graph 111 or 112 by using the key word 122. At a block 208, a target image (for example, the target image 130 shown in FIG. 1) is generated based on the transformed semantic segmentation graph. In some embodiments, the method 200 according to the present disclosure may also include: including the target image 130 and the transformed semantic segmentation graph in the training dataset 140 to enhance the training dataset 140. In this case, the transformed semantic segmentation graph acquired at the block 206 can be used as annotation information of the target image 130. In some embodiments, the source image 121 can include at least one image. Correspondingly, in some embodiments, the target image 130 can include at least one image corresponding to the source image 121.

By means of the method 200 according to the present disclosure, a semantic segmentation graph of a source image and a key word can be used to generate a target image, so as to make the generated target image have a target feature and have semantic consistency with the source image, thereby generating a high-quality target image in a controllable and customizable manner.

In addition, to further improve the quality of the generated target image, the generated target image can be made sufficiently distinguishable from the source image, while maintaining authenticity and keeping similarity with the source image. Regarding this, in some embodiments, the method 200 according to the present disclosure may also include mapping the source image 121 and the key word 122 to a predetermined feature space (for example, a feature space represented by vectors). In some embodiments, in the predetermined feature space, a distance between matched images and key words may be less than a first predetermined distance, and a distance between mismatched images and key words may be greater than a second predetermined distance. In this case, in some embodiments, at the block 208, when the generated target image 130 is mapped to the predetermined feature space, a distance between the target image 130 and the key word 122 can be made less than the first predetermined distance, and a distance between the target image 130 as well as the key word 122 (for example, using a reference point between the target image 130 and the key word 122) and the source image 121 can be made greater than the second predetermined distance. Therefore, the target image and the source image can be made sufficiently distinguishable from each other.

Figure 3:
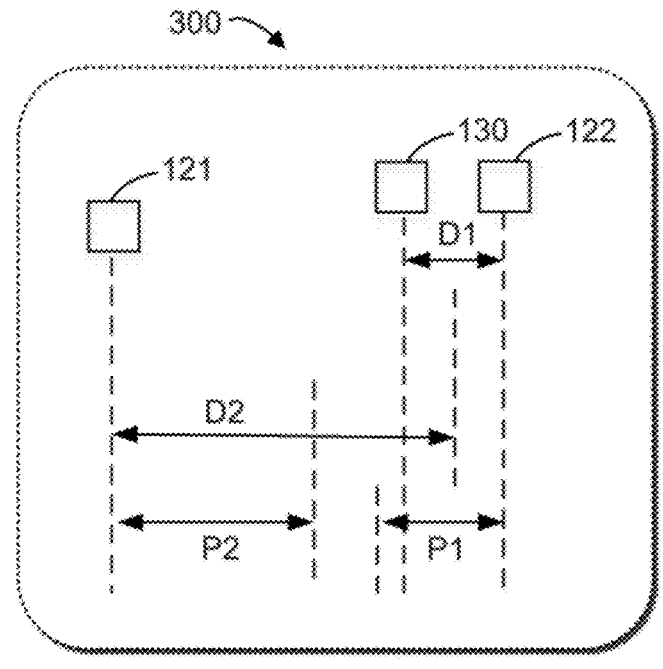
FIG. 3 shows a schematic diagram of a predetermined feature space according to an embodiment of the present disclosure.

FIG. 3 shows a schematic diagram of a predetermined feature space 300 according to an embodiment of the present disclosure. As shown in FIG. 3, a distance D1 between the generated target image 130 and the key word 122 is less than a first predetermined distance P1, and a distance D2 between the target image 130 as well as the key word 122 (for example, using an approximate midpoint of the distance D1 between the target image 130 and the key word 122 as shown in FIG. 3) and the source image 121 is greater than a second predetermined distance P2. In some embodiments, the first predetermined distance P1 and the second predetermined distance P2 can be set according to actual needs. For example, when the above mapping is performed by a neural network model, the first predetermined distance P1 and the second predetermined distance P2 can be determined according to a training degree of the neural network model. Although FIG. 3 merely shows one source image 121, one target image 130, and one key word 122, it should be understood that the predetermined feature space 300 may include more source images, target images, and key words.

With reference again to FIG. 2, in order to make the generated target image have authenticity and maintain similarity with the source image, in some embodiments, at the block 208, a difference between the generated target image 130 and a real-world image can be made less than a predetermined difference threshold. Therefore, the target image can be made to conform to the real-world image type under a complex semantic pattern of the semantic segmentation model.

In addition, at the block 208, the similarity between the generated target image 130 and the source image 121 can be made greater than a predetermined similarity threshold. For example, in a process of generating the target image, it is possible that only the semantic segmentation graph related to the key word is transformed (such as conducting "atomization") without changing other semantic segmentation graphs, so that the generated target image has semantic consistency and high similarity with the source image. As shown in FIG. 1, compared with the source image 121, only the background portion of the target image 130 is atomized, while the content in the target image remains consistent with the source image 121.

In the above case, when including the target image 130 as training data in the training dataset, since the target image 130 and the source image 121 have different features but have semantic consistency, the training dataset can be made to include more types of data without an offset, which further makes the semantic segmentation model trained using the training dataset have higher accuracy and robustness.

Figure 4:
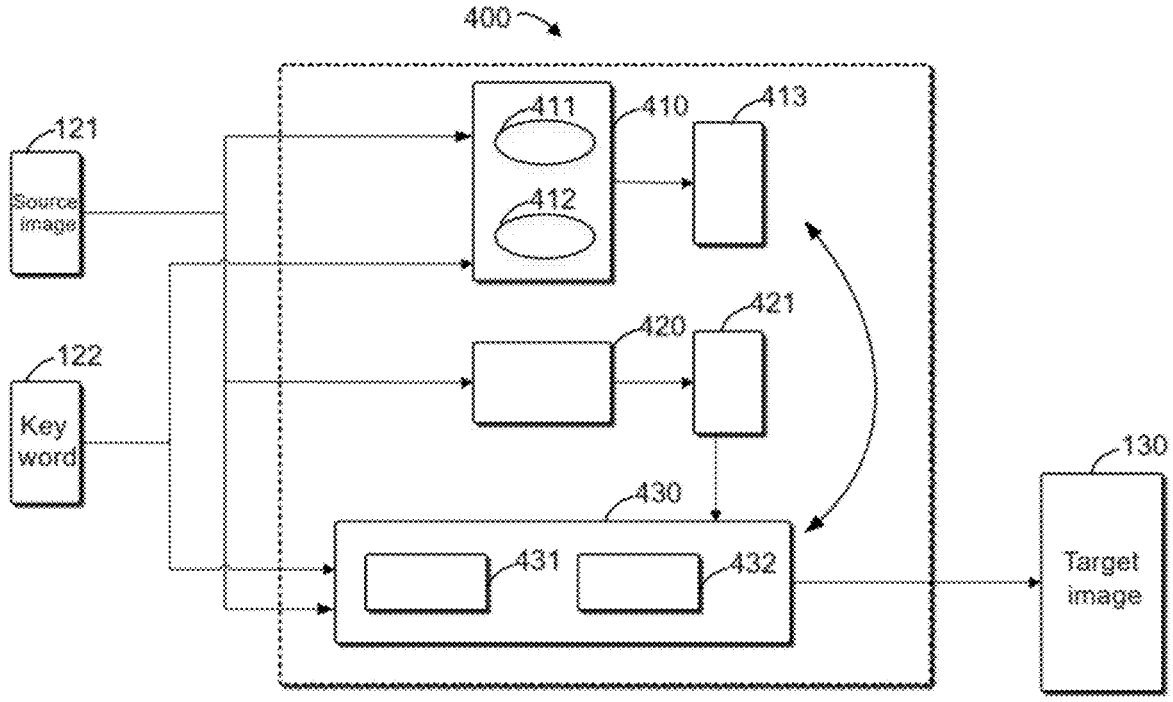
FIG. 4 shows a schematic diagram of a trained neural network model according to an embodiment of the present disclosure.

In some embodiments, to generate images more efficiently and accurately, a trained neural network model can be used to execute the above method 200. FIG. 4 shows a schematic diagram of a trained neural network model 400 according to an embodiment of the present disclosure. As shown in FIG. 4, in some embodiments, the trained neural network model 400 may include a first subnetwork model 410, a second subnetwork model 420, and a third subnetwork model 430. In some embodiments, the first subnetwork model 410 can be used to map the source image 121 and the key word 122 to a predetermined feature space 413 (for example, it can be the predetermined feature space 300 shown in FIG. 3). In some embodiments, the second subnetwork model 420 can be used to acquire a semantic segmentation graph 421 (for example, the semantic segmentation graphs 111 and 112 shown in FIG. 1) by performing semantic segmentation on the source image 121. In some embodiments, the third subnetwork model 430 can be used to transform the semantic segmentation graph 421 by using the key word 122 so as to acquire a transformed semantic segmentation graph and generate the target image 130.

In some embodiments, to obtain the above trained neural network model 400, the method 200 according to the present disclosure may further include: acquiring the first subnetwork model 410 by training a first neural network model 411 and a second neural network model 412. In some embodiments, the first neural network model 411 can be used to map an image to an image feature space, for example, map an image into a vector. In some embodiments, the second neural network model 412 can be used to map the key word 122 to a word feature space, for example, map a word into a vector. For example, the first neural network model 411 and the second neural network model 412 can be any embedded neural network model. In this case, in some embodiments, training the first neural network model 411 and the second neural network model 412 may include: performing joint training on the first neural network model 411 and the second neural network model 412, so as to configure the trained first neural network model 411 and second neural network model 412 to map an input image and an input key word together to the predetermined feature space 413.

In some embodiments, the method 200 according to the present disclosure may further include: acquiring a trained semantic segmentation model as the second subnetwork model 420. In some embodiments, the trained semantic segmentation model can be different from the predetermined semantic segmentation model trained by using a to-be-enhanced training dataset. In some embodiments, the method 200 according to the present disclosure may further include: acquiring the third subnetwork model 430 by training a third neural network mode. In some embodiments, the third neural network model can be based on a generative adversarial network (GAN) architecture. For example, the third neural network model can be based on a GAN prior embedded network (GPEN) architecture. In some embodiments, the third neural network model may include a generator model 431 and a discriminator model 432. The generator model 431 can be used to generate an output image based on an input semantic segmentation graph and an input key word. The discriminator model 432 can be used to determine whether the image is a real-world image.

In some embodiments, training the third neural network model may include: performing joint training on the generator model 431 and the discriminator model 432, so as to configure the trained discriminator model 432 to determine an image having a difference from a real-world image less than the predetermined difference threshold as a real-world image, and configure the trained generator model 431 to generate an output image meeting a predetermined condition. In some embodiments, the predetermined condition may include that: the output image generated by the trained generator model 431 is determined by the trained discriminator model 432 as a real-world image. In addition, in some embodiments, the predetermined condition may further include that: in the predetermined feature space 413 (for example, the predetermined feature space 300 shown in FIG. 3), a distance between the output image generated by the trained generator model 431 and the input key word is less than the first predetermined distance P1. In some embodiments, the predetermined condition may further include that: in the predetermined feature space 413 (or 300), a distance between the output image generated by the trained generator model 431 as well as the input key word and the input image is greater than the second predetermined distance P2. In some embodiments, the predetermined condition may further include that: a similarity between the output image generated by the trained generator model 431 and the input image is greater than the above predetermined similarity threshold.

Example constraints during the training process will be shown below in the form of mathematical expressions. In some embodiments, a contrastive loss function defined in the following Equation (1) can be used to perform joint training on the first neural network model 411 and the second neural network model 412:

$$\mathcal{L}_{contrastive} = \frac{1}{N} \sum i = \tag{1}$$

$$1^N \left( y_i \cdot |E_{\theta,I}(I_i) - E_{\theta,T}(T_i)|_2^2 + (1 - y_i) \cdot \max \left( 0, m - |E_{\theta,I}(I_i) - E_{\theta,T}(T_j)|_2^2 \right) \right)$$

In Equation (1), $\mathcal{L}_{contrastive}$ represents the contrastive loss function, $E_{\theta,I}$ represents the first neural network model 411, $E_{\theta,T}$ represents the second neural network model 412, $I_i$ represents an image input to $E_{\theta,I}$, and $T_i$ and $T_j$ represent the key words correspondingly input to $E_{\theta,T}$. $I_i$ belongs to an image training dataset I, and $T_i$ and $T_j$ belong to a key word training dataset T. $I_i$ and $T_i$ are matched, and $I_i$ and $T_j$ are mismatched. The image training dataset/may include N images (I=$I_1$, $I_2$, . . . , $I_N$), where N is an integer. Correspondingly, the key word training dataset T may include N key words (T=$T_1$, $T_2$, . . . , $T_N$). In Equation (1), if the input images $I_i$ and $T_i$ are matched, $y_i$=0; if the input images $I_i$ and $T_j$ are mismatched, $y_i$=1; m represents a margin hyperparameter for determining whether the input image I and the key word T are matched.

In some embodiments, a parameter $\theta_1$ of the first neural network model $E_{\theta,I}$ 411 and a parameter $\theta_T$ of the second neural network model $E_{\theta,T}$ 412 are adjusted as follows based on Equation (1): when $y_i$=0, the latter term in Equation (1) is made as large as possible; when $y_i$=1, the prior term in Equation (1) is made as small as possible. Hence, in the common predetermined feature space, a distance between the matched images and key words can be made relatively small (for example, less than the first predetermined distance), and a distance between mismatched images and key words can be made relatively large (for example, greater than the second predetermined distance).

In some embodiments, a prior embedded loss function defined by the following Equation (2) can also be used to perform joint training on the first and the second neural network models $E_{\theta,I}$ and $E_{\theta,T}$:

$$\mathcal{L}_{prior} = \max(0, \text{Margin} - \|E_{\theta,I}(I_{ori}) - E_{\theta,T}(y)\|2) + \|E_{\theta,I}(I_{gen}) - E_{\theta,T}(y)\|_2^2 \tag{2}$$

In Equation (2), $\mathcal{L}_{prior}$ represents a prior embedded loss function, $I_{ori}$ represents the source image, $I_{gen}$ represents the generated output image, y represents the input key word, and Margin represents a boundary condition set according to needs. In some embodiments, the parameter $\theta_I$ of the first neural network model $E_{\theta,I}$ 411 and the parameter $\theta_T$ of the second neural network model $E_{\theta,T}$ 412 can be adjusted as follows based on the above Equation (2): making the prior term in Equation (2) as large as possible and the latter term in Equation (2) as small as possible. Therefore, in the predetermined feature space, the distance between the generated output image as well as the key word and the source image can be relatively large, for example, greater than the second predetermined distance.

In some embodiments, for the third neural network model of the third subnetwork model 430 used for FIG. 4, a joint loss function defined by the following Equation (3) can be used to perform joint training on the generator model 431 and the discriminator model 432 included in the third neural network model:

$$\mathcal{L} = \mathcal{L}_{adv} + \lambda_1 \mathcal{L}_{prior} + \lambda_2 \mathcal{L}_{recon} \qquad (3)$$

In Equation (3), $\mathcal{L}$ represents a joint loss function, $\mathcal{L}_{adv}$ represents a contrastive loss function, $\mathcal{L}_{prior}$ represents another prior embedded loss function, $\mathcal{L}_{recon}$ represents a reconstruction loss function, and $\lambda_1$ and $\lambda_2$ represent weight coefficients set according to actual needs.

$\mathcal{L}_{adv}$ can be represented by the following Equation (4):

$$\mathcal{L}_{adv} = \mathbb{E}_{x \sim preal}, [\log(D(x))] + \mathbb{E}_{z \sim pz}[\log(1 - D(G(z)))] \qquad (4)$$

In Equation (4), G represents the generator model 431, D represents the discriminator model 432, $\mathbb{E}_{x \sim preal}$ represents an expected value for the real-world image x, and $\mathbb{E}_{z \sim pz}$ represents an expected value for the generated output image z. Therefore, the trained discriminator model D is made to determine an image with a difference from a real-world image less than the predetermined difference threshold as a real world image (for example, the predetermined difference threshold can be a threshold determined according to a state (for example, the resolution) of the discriminator model D when the training ends), and the output image generated by the trained generator model G is enabled to be determined by the trained discriminator model D as a real-world image.

$\mathcal{L}_{prior}$ can be represented by the following Equation (5):

$$\mathcal{L}_{prior} = \|E_{\theta,I}(I_{ori}) - E_{\theta,I}(I_{gen}) - E_{\theta,T}(y)\|_2^2 \qquad (5)$$

Equation (5) can be used to make the distance between the output image generated by the trained generator model G as well as the input key word and the input image greater than the second predetermined distance in the predetermined feature space (the predetermined feature space 413 of the first subnetwork model 410).

$\mathcal{L}_{recon}$ can be represented by the following Equation (6):

$$\mathcal{L}_{recon} = \|I_{gen} - I_{ori}\|_1 \qquad (6)$$

Equation (6) can be used to make the similarity between the output image generated by the trained generator model G and the input image greater than the predetermined similarity threshold. It should be understood that the first predetermined distance, the second predetermined distance, the predetermined similarity threshold, and so on can be determined by the state (for example, the accuracy) of the trained neural network model 400 when the training ends. In addition, in some embodiments, during a process of adjusting the parameters $\theta_I$ and $\theta_T$ of the above models $E_{\theta,I}$ and $E_{\theta,T}$ and parameters of the generator model G and the discriminator model D based on the above Equations (1)-(6), a stochastic gradient descent (SGD) method can be used for adjustment.

After obtaining the trained neural network model 400 by training in the above manner, the target image can be generated by means of the method 200 shown in FIG. 2, so as to enhance the training dataset 140 used for the predetermined semantic segmentation model. In addition, in some embodiments, in a case where there is a semantic segmentation graph set (for example, a semantic segmentation graph pool) obtained in advance, the target image can also be generated by merely using a trained third subnetwork model 430.

Figure 5:
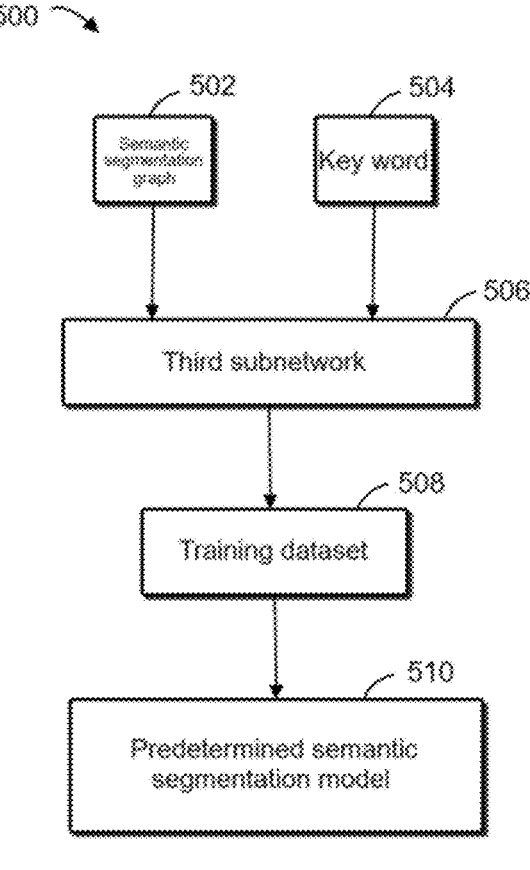
FIG. 5 shows a schematic diagram of generating and using a target image according to an embodiment of the present disclosure.

FIG. 5 shows a schematic diagram 500 of generating and using a target image according to an embodiment of the present disclosure. As shown in FIG. 5, a trained third subnetwork 506 (for example, the third subnetwork model 430 in FIG. 4) can receive a semantic segmentation graph and a key word from a semantic segmentation graph set 502 and a key word set 504. The trained third subnetwork 506 can generate a target image based on the received semantic segmentation graph and key word. The generated target image and a transformed semantic segmentation graph used for generating the target image can be included in a training dataset 508 so as to enhance the training dataset 508. Then, the enhanced training dataset 508 can be used for training a predetermined semantic segmentation model 510.

In some embodiments, for example, the original training dataset 508 can be represented by $D_{ori}=(x_i, y_i)$ $i=1^{n_{ori}}$, $x_i$ here represents the source image, $y_i$ represents the corresponding annotation (for example, the semantic segmentation graph of the source image), i represents an index value, and i is an integer. The enhanced training dataset 508 can be represented by $D_{aug}=(x_j, y_j)$ $j=1^{n_{aug}}$. For example, $n_{aug}=n_{ori}+n_{gen}$, $n_{aug}$ represents the quantity of images in the enhanced training dataset 508, $n_{ori}$ represents the quantity of images in the original training dataset 508, and $n_{gen}$ represents the quantity of the generated target images.

In some embodiments, training of a predetermined semantic segmentation model 510 can be performed by means of minimizing a target function represented by the following Equation (7):

$$L = \frac{1}{n_{aug}} \sum_{j=1}^{n_{aug}} l(f(x_j), y_j) \qquad (7)$$

In Equation (7), $f(x_j)$ represents an output from the predetermined semantic segmentation model 510 for the input image $x_j$, and $l(f(x_j), y_j)$ represents a loss function for the predetermined semantic segmentation model 510.

Figure 6:
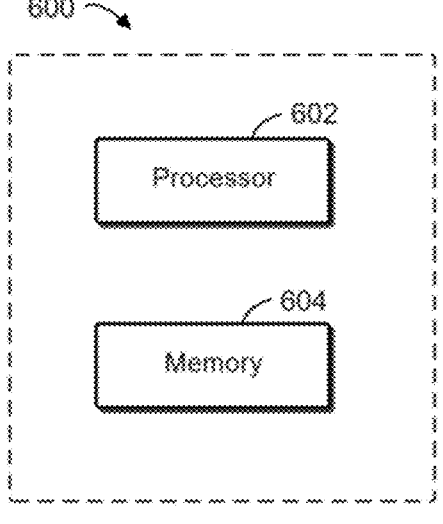
FIG. 6 shows a block diagram of an electronic device for generating an image according to an embodiment of the present disclosure.

FIG. 6 shows a block diagram of an electronic device for generating an image according to an embodiment of the present disclosure. The electronic device 600 shown in FIG. 6 can be the device 110 shown in FIG. 1 or any electronic device capable of executing the method according to the present disclosure. The electronic device 600 may include at least one processor 602 and a memory 604. The memory 604 is coupled to the at least one processor 602 and has instructions stored thereon. The instructions, when executed by the at least one processor 602, cause the electronic device 600 to perform actions. In some embodiments, the actions include acquiring a semantic segmentation graph by performing semantic segmentation on a source image. In some embodiments, the source image is an image in a training dataset, and the training dataset is used for training a predetermined semantic segmentation model. In some embodiments, the actions may further include acquiring a key word for describing a feature of a to-be-generated target image. In some embodiments, the actions may further include transforming the semantic segmentation graph by using the key word so as to acquire a transformed semantic segmentation graph. In some embodiments, the actions may further include generating the target image based on the transformed semantic segmentation graph. In some embodiments, the source image may include at least one image, and the target image may include at least one image corresponding to the source image. In some embodiments, the actions may further include including the target image and the transformed semantic segmentation graph in the training dataset to enhance the training dataset. In some embodiments, the transformed semantic segmentation graph can be used as annotation information of the target image. In some embodiments, the actions further include mapping the source image and the key word to a predetermined feature space.

In some embodiments, in the predetermined feature space, a distance between matched images and key words is less than a first predetermined distance, and a distance between mismatched images and key words is greater than a second predetermined distance. In some embodiments, generating the target image based on the transformed semantic segmentation graph may include: when the generated target image is mapped to the predetermined feature space, a distance between the target image and the key word is less than the first predetermined distance, and a distance between the target image as well as the key word and the source image is greater than the second predetermined distance. In some embodiments, generating the target image based on the transformed semantic segmentation graph may further include: making a difference between the generated target image and a real-world image less than a predetermined difference threshold, and making a similarity between the generated target image and the source image greater than a predetermined similarity threshold.

In some embodiments, the electronic device 600 can execute the actions by means of a trained neural network model. In some embodiments, the trained neural network model may include a first subnetwork model, a second subnetwork model, and a third subnetwork model. In some embodiments, the first subnetwork model can be used to map the source image and the key word to the predetermined feature space. In some embodiments, the second subnetwork model can be used to acquire the semantic segmentation graph by performing semantic segmentation on the source image. In some embodiments, the third subnetwork model can be used to transform the semantic segmentation graph by using the key word so as to acquire the transformed semantic segmentation graph and generate the target image.

In some embodiments, the actions executed by the electronic device 600 may further include: acquiring the first subnetwork model by training a first neural network model and a second neural network model. In some embodiments, the first neural network model can be used to map an image to an image feature space. In some embodiments, the second neural network model can be used to map a key word to a word feature space. In some embodiments, training the first neural network model and the second neural network model may include: performing joint training on the first neural network model and the second neural network model, so as to configure the trained first neural network model and second neural network model to map an input image and an input key word together to the predetermined feature space.

In some embodiments, the actions may further include acquiring a trained semantic segmentation model as the second subnetwork model. In some embodiments, the trained semantic segmentation model can be different from the predetermined semantic segmentation model. In some embodiments, the actions may further include training a third neural network model to acquire the third subnetwork model. In some embodiments, the third neural network model can be based on a generative adversarial network architecture. In some embodiments, the third neural network model may include a generator model and a discriminator model. In some embodiments, the generator model can be used to generate an output image based on an input semantic segmentation graph and an input key word. In some embodiments, the discriminator model can be used to determine whether the image is a real-world image. In some embodiments, training the third neural network model may include: performing joint training on the generator model and the discriminator model, so as to cause the trained discriminator model to determine an image having a difference from a real-world image less than the predetermined difference threshold as a real-world image, and cause the trained generator model to generate an output image meeting a predetermined condition. In some embodiments, the predetermined condition may include that: the output image is determined by the trained discriminator model as a real-world image. In some embodiments, the predetermined condition may further include that: in the predetermined feature space, a distance between the output image and the input key word is less than the first predetermined distance. In some embodiments, the predetermined condition may further include that: in the predetermined feature space, a distance between the output image as well as the input key word and the input image is greater than the second predetermined distance. In some embodiments, the predetermined condition may further include that: a similarity between the output image and the input image is greater than the predetermined similarity threshold.

According to the electronic device of an embodiment of the present disclosure, a semantic segmentation graph of a source image and a key word can be used to generate a target image, so as to make the generated target image have a target feature and have semantic consistency with the source image, thereby generating a high-quality target image in a controllable and customizable manner.

Figure 7:
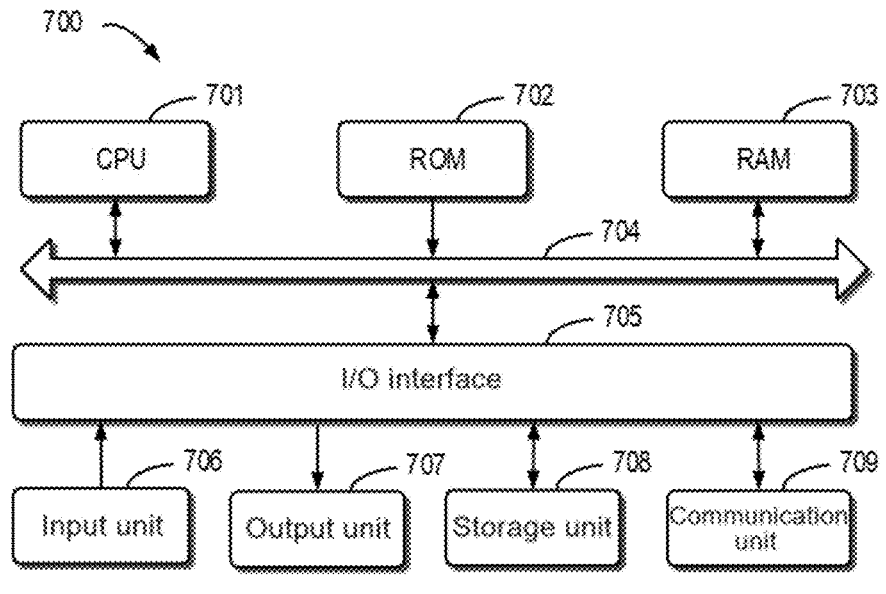
FIG. 7 shows a block diagram of an example device suitable for implementing embodiments of the present disclosure.

FIG. 7 illustrates a block diagram of an example device 700 which can be used to implement embodiments of the present disclosure. The electronic device in FIG. 1 or FIG. 6 can be implemented using the device 700. As shown in the figure, the device 700 includes a central processing unit (CPU) 701 that may execute various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various processes and processing procedures described above, such as the method 200, may be performed by the CPU 701. For example, in some embodiments, the method 200 may be implemented as a computer software program that is tangibly included in a machine-readable medium, such as the storage unit 708. In some embodiments, part or all of the computer program may be loaded and/or installed onto the device 700 via the ROM 702 and/or the communication unit 709. When the computer program is loaded into the RAM 703 and executed by the CPU 701, one or more actions of the method 200 described above may be executed.

Illustrative embodiments of present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technological improvements, so as to enable persons of ordinary skill in the art to understand the embodiments disclosed herein.

What is claimed is:

1. A method for generating an image, comprising:
   acquiring a semantic segmentation graph by performing semantic segmentation on a source image;
   acquiring a key word for describing a feature of a to-be-generated target image;
   transforming the semantic segmentation graph by using the key word so as to acquire a transformed semantic segmentation graph; and
   generating the target image based on the transformed semantic segmentation graph;
   wherein generating the target image based on the transformed semantic segmentation graph comprises determining the target image based on (i) comparison to an additional image using a first threshold and (ii) comparison to the source image using a second threshold.

2. The method according to claim 1, wherein the source image is an image in a training dataset, and the training dataset is used for training of a predetermined semantic segmentation model.

3. The method according to claim 2, further comprising:
   including the target image and the transformed semantic segmentation graph in the training dataset to enhance the training dataset,
   wherein the transformed semantic segmentation graph is used as annotation information of the target image.

4. The method according to claim 2, further comprising:
   mapping the source image and the key word to a predetermined feature space,
   wherein in the predetermined feature space, a distance between matched images and key words is less than a first predetermined distance, and a distance between mismatched images and key words is greater than a second predetermined distance; and
   wherein generating the target image based on the transformed semantic segmentation graph comprises that: when the generated target image is mapped to the predetermined feature space, a distance between the target image and the key word is less than the first predetermined distance, and a distance between the target image as well as the key word and the source image is greater than the second predetermined distance.

5. The method according to claim 4, wherein generating the target image based on the transformed semantic segmentation graph further comprises: making a difference between the generated target image and a real-world image less than a predetermined difference threshold, and making a similarity between the generated target image and the source image greater than a predetermined similarity threshold.

6. The method according to claim 5, wherein the method is executed by using a trained neural network model.

7. The method according to claim 6, wherein the trained neural network model comprises a first subnetwork model, a second subnetwork model, and a third subnetwork model,
   the first subnetwork model is used to map the source image and the key word to the predetermined feature space,
   the second subnetwork model is used to acquire the semantic segmentation graph by performing semantic segmentation on the source image, and
   the third subnetwork model is used to transform the semantic segmentation graph by using the key word so as to acquire the transformed semantic segmentation graph and generate the target image.

8. The method according to claim 7, further comprising:
   acquiring the first subnetwork model by training a first neural network model and a second neural network model, wherein the first neural network model is used to map an image to an image feature space, and the second neural network model is used to map a key word to a word feature space;
   acquiring a trained semantic segmentation model as the second subnetwork model, wherein the trained semantic segmentation model is different from the predetermined semantic segmentation model; and
   acquiring the third subnetwork model by training a third neural network model, and the third neural network model is based on a generative adversarial network (GAN) architecture.

9. The method according to claim 8, wherein training the first neural network model and the second neural network model comprises:
   performing joint training on the first neural network model and the second neural network model, so as to configure the trained first neural network model and second neural network model to map an input image and an input key word together to the predetermined feature space.

10. The method according to claim 8, wherein the third neural network model comprises a generator model and a discriminator model, the generator model is used to generate an output image based on an input semantic segmentation graph and an input key word, and the discriminator model is used to determine whether an image is a real-world image.

11. The method according to claim 10, wherein training the third neural network model comprises:
   performing joint training on the generator model and the discriminator model, so as to cause the trained discriminator model to determine an image having a difference from a real-world image less than the predetermined difference threshold as a real-world image, and cause the trained generator model to generate an output image meeting a predetermined condition,
   wherein the predetermined condition comprises that the output image is determined by the trained discriminator model as a real-world image.

12. The method according to claim 11, wherein the predetermined condition further comprises that:
   in the predetermined feature space, a distance between the output image and the input key word is less than the first predetermined distance;
   in the predetermined feature space, a distance between the output image as well as the input key word and an input image is greater than the second predetermined distance; and
   a similarity between the output image and the input image is greater than the predetermined similarity threshold.

13. The method according to claim 1, wherein the source image comprises at least one image, and the target image comprises at least one image corresponding to the source image.

14. An electronic device, comprising:

at least one processor; and memory coupled to the at least one processor and having instructions stored thereon, wherein the instructions, when executed by the at least one processor, cause the electronic device to perform actions comprising:

acquiring a semantic segmentation graph by performing semantic segmentation on a source image;

acquiring a key word for describing a feature of a to-be-generated target image;

transforming the semantic segmentation graph by using the key word so as to acquire a transformed semantic segmentation graph; and generating the target image based on the transformed semantic segmentation graph;

wherein generating the target image based on the transformed semantic segmentation graph comprises determining the target image based on (i) comparison to an additional image using a first threshold and (ii) comparison to the source image using a second threshold.

15. The electronic device according to claim 14, wherein the source image is an image in a training dataset, and the training dataset is used for training of a predetermined semantic segmentation model.

16. The electronic device according to claim 15, wherein the actions further comprise:

including the target image and the transformed semantic segmentation graph in the training dataset to enhance the training dataset, wherein the transformed semantic segmentation graph is used as annotation information of the target image.

17. The electronic device according to claim 15, wherein the actions further comprise:

mapping the source image and the key word to a predetermined feature space, wherein in the predetermined feature space, a distance between matched images and key words is less than a first predetermined distance, and a distance between mismatched images and key words is greater than a second predetermined distance; and wherein generating the target image based on the transformed semantic segmentation graph comprises that: when the generated target image is mapped to the predetermined feature space, a distance between the target image and the key word is less than the first predetermined distance, and a distance between the target image as well as the key word and the source image is greater than the second predetermined distance.

18. The electronic device according to claim 17, wherein generating the target image based on the transformed semantic segmentation graph further comprises: making a difference between the generated target image and a real-world image less than a predetermined difference threshold, and making a similarity between the generated target image and the source image greater than a predetermined similarity threshold.

19. The electronic device according to claim 18, wherein the electronic device executes the actions using a trained neural network model.

20. A computer program product comprising a non-transitory computer-readable medium having machine-executable instructions stored therein, wherein the machine-executable instructions, when executed by a machine, cause the machine to perform actions comprising:

acquiring a semantic segmentation graph by performing semantic segmentation on a source image;

acquiring a key word for describing a feature of a to-be-generated target image;

transforming the semantic segmentation graph by using the key word so as to acquire a transformed semantic segmentation graph; and generating the target image based on the transformed semantic segmentation graph;

wherein generating the target image based on the transformed semantic segmentation graph comprises determining the target image based on (i) comparison to an additional image using a first threshold and (ii) comparison to the source image using a second threshold.

* * * * *